July 9, 1957
A. MAMO
2,798,625
BOAT TRAILER
Filed July 25, 1955
3 Sheets-Sheet 1
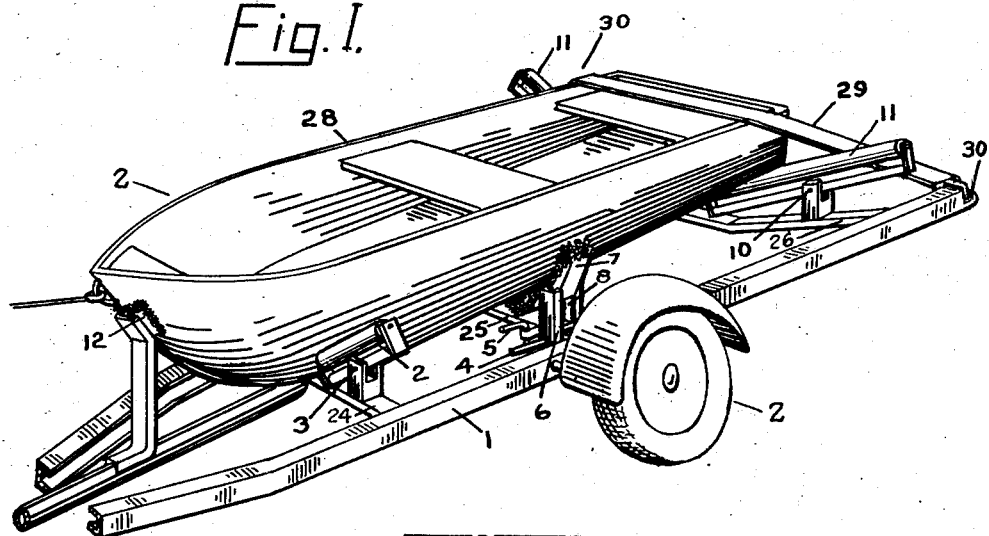
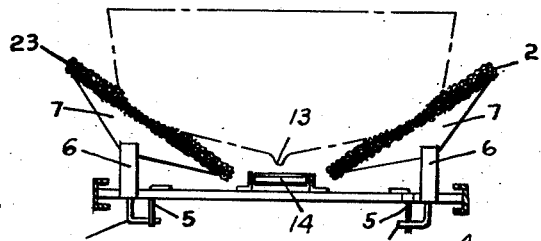
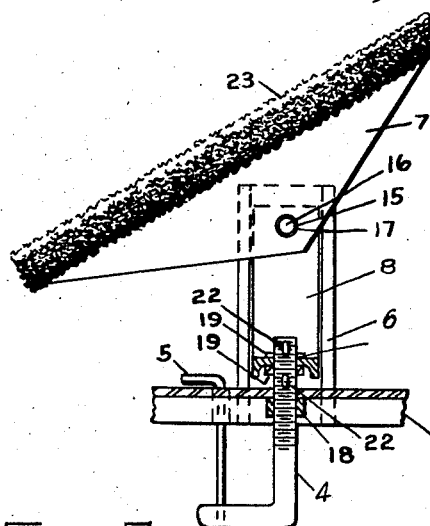
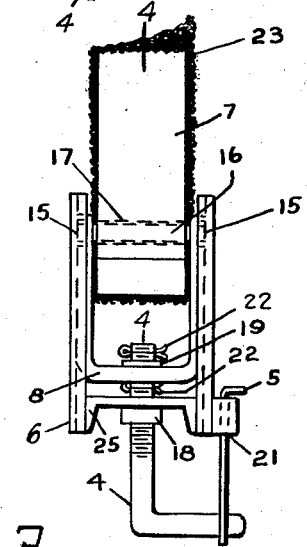
INVENTOR.
ANTHONY MAMO.

July 9, 1957
A. MAMO
2,798,625
BOAT TRAILER
Filed July 25, 1955
3 Sheets-Sheet 2
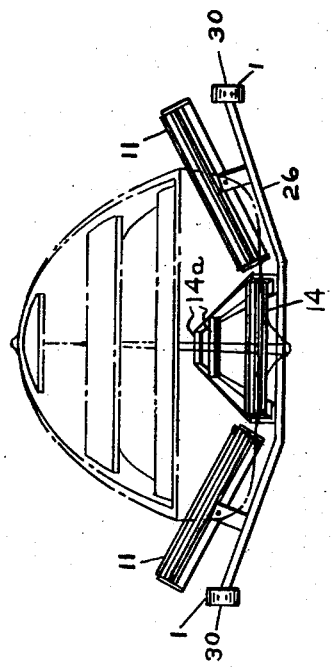
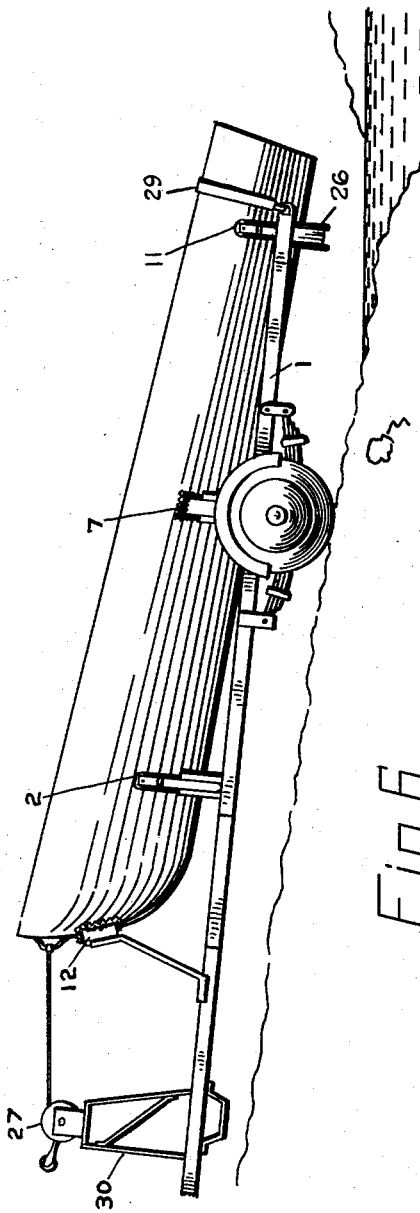
INVENTOR.
ANTHONY MAMO.
BY
ATTY.

July 9, 1957   A. MAMO   2,798,625
BOAT TRAILER
Filed July 25, 1955   3 Sheets-Sheet 3
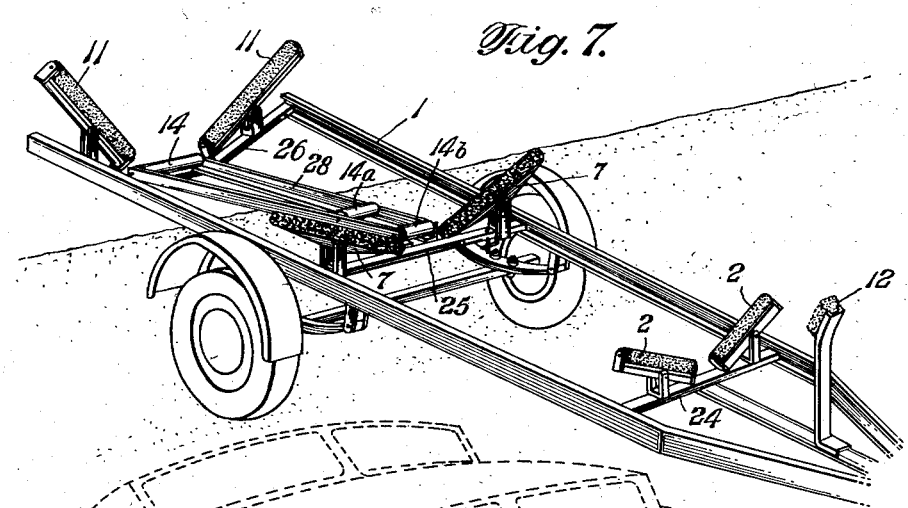
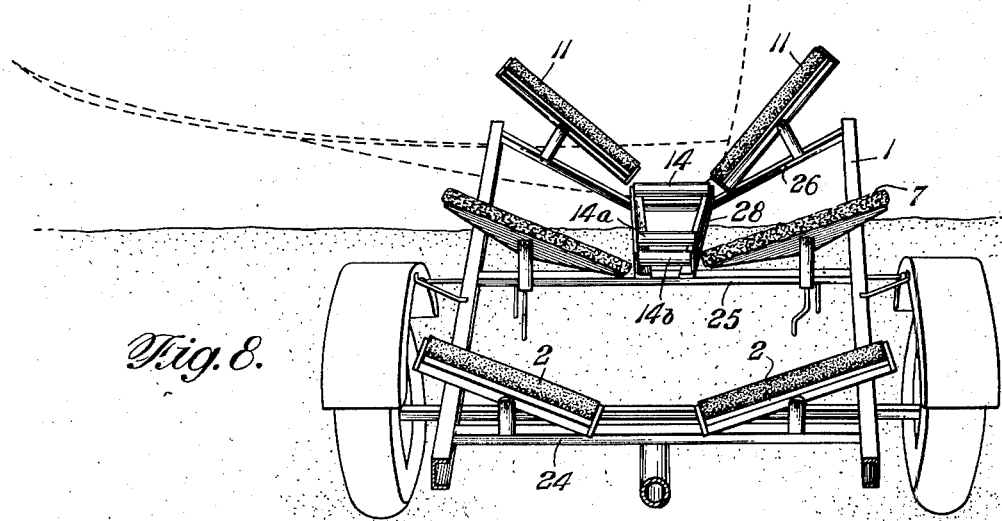
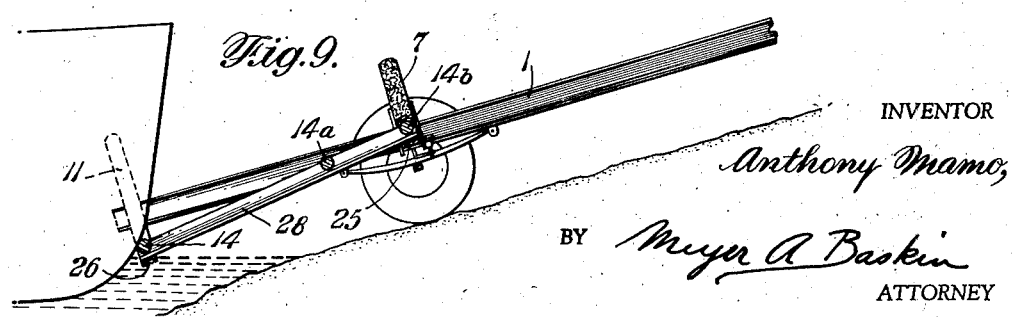
INVENTOR
Anthony Mamo,
BY Meyer A. Baskin
ATTORNEY

United States Patent Office 2,798,625
Patented July 9, 1957

2,798,625

BOAT TRAILER

Anthony Mamo, Miami, Fla.

Application July 25, 1955, Serial No. 524,146

8 Claims. (Cl. 214—84)

This invention relates to boat trailers, particularly for small boats up to about 14 to 16 feet in length. Boat trailers in the past have been cumbersome affairs often requiring a double frame, one stationary frame and one frame moveably hinged at the wheel axle for lifting the boat on the trailer. They also required that the center of gravity of the boat be brought beyond the axle of the supporting wheels before it would fall into horizontal position on the trailer in loading operation. Other types of trailers required that much of the trailer, particularly the wheels be immersed in the water when launching or loading a boat. They also ususally required two man operation, one to handle the winch and the other to hold the boat headed and centered into the trailer.

My invention eliminates the double frame, the immersed wheels and the need for a second operator to center the boat while loading. My boat trailer also only requires the center of gravity of the boat to pass the end of the rear of the trailer before it will fall into horizontal position on the trailer in loading operation.

This invention relates to a boat trailer and consists of a chassis supporting a nesting device for the bow and two sets of adjustable rollers, and one or more sets of compound adjustable padded chocks. The object of this trailer is to make a launching or a loading of a boat so easy and simple as to require the action of only one person by either sliding the boat forward on the rollers or pulling the boat forward with winch located at front end of trailer.

Another object of this trailer is to keep the keel of the boat up and clear from the center loading rollers when in fully loaded position for traveling.

Two compound adjustable padded chocks bear the major weight of the hull and make any sagging of the boat impossible during transfer. The bow of the boat is nested at the forward end of the trailer. The hull is cradled centrally by the two sets of rollers and held rigidly against the adjustable chocks. The boat is strapped securely across the stern, so as to hold it firmly in place and prevent motion in transit. The chocks hold the hull up so that the keel is clear of the center rollers.

It is the further object of this invention to keep the boat from sagging with the use of two compound adjustable chocks, and to provide a simple means of adjusting said chocks.

It is the further object of this invention to provide a boat trailer having the rear chassis cross member underslung with respect to the other cross members, thus enabling the trailer wheels to remain out of the water when launching and loading the boat.

It is the further object of this invention to provide rear side pivoting rollers positioned to automatically head the boat in properly without the need of a second operator when being loaded from the water.

It is a further object of this invention to make the loading and launching of a boat an easy chore, thus adding pleasure to the sport of boating.

This invention relates to various combinations of elements which are described hereinafter and shown in the appended drawing.

Figure 1 is a perspective view of the trailer holding boat and showing bow of boat nested and one each of the two sets of rollers and one of the two chocks to which this invention relates.

Figure 2 is a view taken through line 2—2 of Figure 1, approximately at the center of the boat showing the pair of adjustable pivoted padded chocks in their relative positions to support the hull of the boat and keeping the keel up and clear of the center loading roller. For a larger boat a second pair of chocks can be added.

Figure 3 is a rear view of one of the chocks showing the lifting screw mechanism and stop pin.

Figure 4 is a side view of padded chock taken through line 4—4 of Figure 3 showing construction of lifting screw mechanism and showing pivoting point of chock.

Figure 5 is a rear view of chassis of trailer showing how rear adjusting rollers automatically center the boat when loading.

Figure 6 is side view of trailer after loading boat, showing that with the use of my trailer the wheels do not need to enter the water.

Figure 7 is a side perspective view of the trailer.

Figure 8 is a front perspective view of the trailer with portions shown in section and showing the trailer in the boat loading position.

Figure 9 is a vertical sectional view of the trailer showing the position of the trailer as it is loading a boat thereon on an inclined beach.

The trailer chassis 1 at its forward end contains a V-shaped and padded nest 12 to hold the bow of a boat which is secured to the tongue of the trailer. An intermediate cross member 25 is set perpendicular to the center line of trailer chassis 1 supporting two compound adjustable padded chocks 7, 7 which are supported on pivot 15 shown in Figure 4. A forward cross member 24 is set perpendicular to the center of trailer chassis 1 supporting two adjustable rollers 2, 2 which pivot at 3 and a rear cross member 26 is set perpendicular to the center of trailer chassis 1 supporting two adjusting rollers 11, 11 which pivot at 10. Rear cross member 26 is underslung with respect to the body of the chassis, and the other cross members.

In the construction of chocks 7, 7, handle 4 is an L-shaped bar threaded on the long end and having two holes for cotter pins 22. The threads of handle 4 mesh with internal threads of washer 18 which is securely fastened to the web of crossbar 25 to give added thread length. The thread of handle 4 passes through a U-shaped channel 8 having two holes 15 one in each prong to house a pin 16. The pin 16 has been inserted through hole 17 in chock 7. Hole 17 is large enough to allow a pivoting motion of chock 7. On both sides of the web of crossbar 25 are a washer 19 and cotter pins 22 which hold 8 and 4 together. Thus when 4 is screwed through washer 18 and web of cross bar, it freely turns in hole 31. Being secured to channel 8 with washers 19 and cotter pins 22, a continuous turn of handle 4 to the right, raises channel 8 which is connected to chock 7 with pin 16. Pivoting motion of chock 7 around pin 16 allows for the self adjusting of chock 7 to the contour of the hull of the boat.

Padding 23 of top side of chocks 7 can be of wool or rubber or any suitable material and is used particularly with the object of preventing any marring to the finish of the hull.

Covering of rollers 2, 2 and 11, 11 can be of rubber or other suitable material.

Referring now to Figure 7, the trailer is shown in the unloaded position and the relative location of each of the rollers is clearly illustrated. For example, the frame 1 which consists of the parallel longitudinal side frame members also includes the cross bar transverse members 24 and 25 which are generally planular with respect to the side frame members. However, as pointed out above, the rearmost cross bar or transverse member 26 extends downwardly, being dropped substantially below the frame 1 and thus generally defines a U-configuration. Connecting the transverse members 25 and 26 is an inclined track 28 on which are mounted the rollers 14, 14a and 14b. The rear adjustable rollers 11, 11 are pivotally mounted on the underslung transverse member, and as shown in Figure 8 the lowermost edge of each roller 11 overlaps a portion of the roller 14. By overlapping the rollers 11, 11 and 14 the bow of the boat is prevented from being damaged as it passes over the transverse member 26. The pivotally mounted rollers 11, 11 normally define a modified V-configuration but are adapted to pivot on their pivotal connections as the boat hull makes contact therewith. The rollers 11 which are mounted on the underslung member 26 are thus adapted to move in response to movement of the hull of the boat passing thereover, and thereby conform to the position of the boat as the boat keel is drawn upwardly on the rollers 14, 14a, 14b.

When boat is to be loaded the trailer is run down the beach to about the position shown in Figures 8 and 9. The underslung transverse member 26 is then positioned over the surface of the water or in contact therewith. The bow of the boat is thus easily guided over the rearmost transverse member 26 into contact with the inclined rollers 11, 11 and a transverse roller 14 and is then either rolled forward manually or by means of a winch 27 that is secured on a bracket 30 shown in Figure 6, with keel rolling on roller 14. When the hull of the boat shown in dotted lines in Figure 8 touches rollers 11, 11, then the contour of the hull automatically forces rollers 11, 11 to adjust themselves to the contour of the hull. Rollers 11, 11 at the same time center the boat and force it to head directly into the trailer without the need for a second operator. Thus one man operating the winch 27 can load the boat on the trailer. It is seen that by utilizing the present invention a single person may conveniently load a boat onto the trailer described herein and this includes boats of relatively large size or draft. The keel rides up on center roller 14 and additional center rollers 14a, 14b, the roller 14 being secured to the lower end of the track 28 and positioned between the rollers 11, 11, the roller 14b being secured to the upper end of the track 28 and positioned between the chocks 7, 7, and the roller 14a being secured to the track 28 intermediate the rollers 14 and 14b. The bow of the boat is nested in nest 12 and boat cradled between rollers 2, 2 and rollers 11, 11.

Chocks 7, 7 are then raised mechanically by first removing stop pins 5 from holder 21 then turning screw handles 4 to the right until chocks 7, 7 have adjusted themselves to support the hull of the boat. The chocks 7, 7 raise the hull so that the keel clears center roller 14 and the other center rollers 14a.

The stern of the hull is secured in place by strap 29 to ends 30, 30 of chassis 1. Stop pins 5 are reinserted into support 21 and will become a stop against handles 4 if from vibration in transport of boat there is a tendency for handles 4 to turn causing chocks 7, 7 to become loose and fail to support the hull of the boat.

When launching the boat the procedure is reversed, that is, strap 29 and stop pin 5 are removed, handles 4 are turned to lower chocks 7, 7. The boat keel then rests on rollers 2, 2 and 11, 11 and 14b and can be readily launched by releasing the winch 27.

It may here be stated that the means for centering the boat when loading is disclosed but not claimed in my copending application for a Break Frame Boat Trailer, Ser. No. 371,507, filed July 31, 1953, and now Patent No. 2,765,941.

I have described my invention above and it is to be limited only by the following claims.

I claim:

1. In a boat trailer, a frame including spaced transverse members, and pairs of supporting members associated with each of said transverse members, the transverse member adjacent the rear end of said frame being dropped substantially below said frame, and the pair of supporting members associated with said rear transverse member being pivotally mounted thereon and inclined with respect thereto, the lower end of each of said rear supporting members extending below said frame and positioned closely adjacent said rear transverse member, said rear supporting members thereby being positioned to guide the bow of the boat onto said trailer frame.

2. In a boat trailer as set forth in claim 1, which includes a pair of opposed pivoted chocks mounted on one of said transverse members, adjustment means engaging said chocks for raising said chocks into contact with the hull of said boat, said adjustment means including threaded handles for effecting the raising operation.

3. In a boat trailer as set forth in claim 2, wherein each of said chocks includes a housing containing a U-shaped member and a pivoting head attached thereto, said U-shaped member being adjusted in a vertical plane for vertically moving the chocks associated therewith.

4. In a boat trailer having a frame, a plurality of transverse members secured to said frame, the rearmost of said transverse members being substantially underslung with respect to said frame and the other transverse members, a pair of opposed pivoted rollers mounted on said underslung transverse member and a center transverse roller mounted between said pivoted rollers, a pair of opposed adjustable chocks mounted on one of the other transverse members, and adjustment handles operatively connected to said chocks for vertically raising said chocks to contact the hull of a boat loaded on said trailer, said chocks lifting said hull sufficiently to allow the boat keel to clear the trailer frame.

5. In a boat trailer, a frame, wheels rotatably mounted on said frame, said frame including a plurality of spaced transverse members, the rearmost of said transverse members being dropped substantially below the plane of said frame, and a pair of rollers pivotally mounted on said rearmost transverse member and being normally inclined with respect to each other, the lowermost end of said rollers extending substantially below the plane of said frame and being located immediately adjacent said rearmost transverse member, whereby the bow of a boat being loaded on said trailer is guided onto said frame by the inclined rollers.

6. In a boat trailer, a frame, wheels rotatably mounted on said frame, said frame including a plurality of spaced transverse members, the rearmost of which is dropped substantially below the plane of said frame and defines the rear end of said trailer, a pair of guide rollers pivotally mounted on said rearmost transverse member and being normally inclined, the lowermost edge of said rollers extending substantially below the plane of said frame, and the uppermost edge thereof extending above the plane of said frame, whereby contact of said rollers with the bow of the boat to be loaded on said frame is facilitated, and a transverse roller mounted between said first named rollers and cooperating therewith to guide the bow of said boat onto said trailer frame.

7. In a boat trailer, a frame, wheels rotatably mounted on said frame, said frame including a plurality of spaced transverse members, the rearmost of said transverse members extending substantially below the plane of said frame and adapted to be positioned closely adjacent the water during the boat loading operation when the trailer is located on an inclined beach, said wheels thereby remaining on dry ground, a pair of guide rollers pivotally mounted on said rearmost transverse member and being inclined to receive the bow of said boat, the lowermost edge of said inclined rollers being positioned closely adjacent said rearmost transverse member and thereby extending substantially below the plane of said frame, and the upper edge of said inclined rollers being positioned substantially above the plane of said frame, whereby contact of said rollers with the bow of said boat is facilitated, said rollers thereby guiding said boat onto said frame during the loading operation.

8. In a boat trailer as set forth in claim 7, which includes a transverse roller mounted between said inclined rollers for contacting the keel of said boat during the loading operation, thereby enabling said boat to be more easily drawn onto said frame.

References Cited in the file of this patent

UNITED STATES PATENTS

| | | |
|---|---|---|
| 2,558,418 | Brueckman | June 26, 1951 |
| 2,608,314 | Krider | Aug. 26, 1952 |
| 2,636,745 | Cartwright | Apr. 28, 1953 |
| 2,676,716 | Sallis | Apr. 27, 1954 |
| 2,691,534 | Sampsell | Oct. 12, 1954 |
| 2,723,038 | Peterson et al. | Nov. 8, 1955 |